Aug. 10, 1926.

E. HOPKINSON 1,595,193

VULCANIZING MOLD

Original Filed April 18, 1922  2 Sheets-Sheet 1

Inventor
ERNEST HOPKINSON

Attorney

Aug. 10, 1926.
E. HOPKINSON
1,595,193
VULCANIZING MOLD
Original Filed April 18, 1922   2 Sheets-Sheet 2
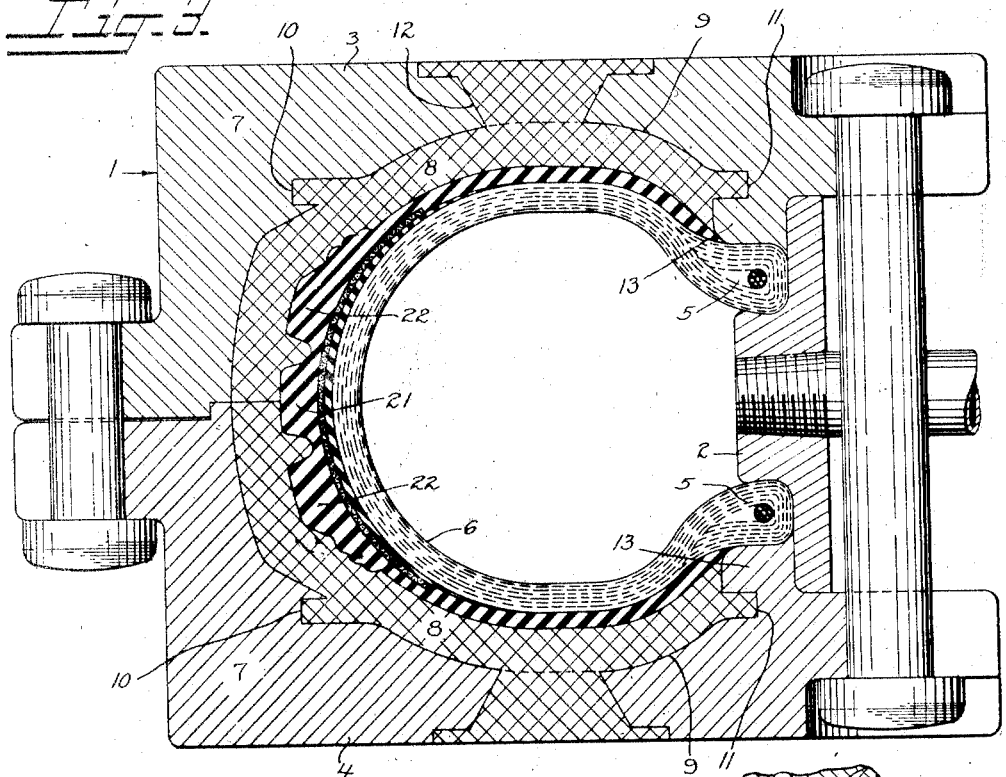
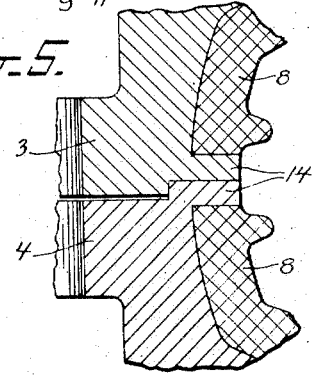
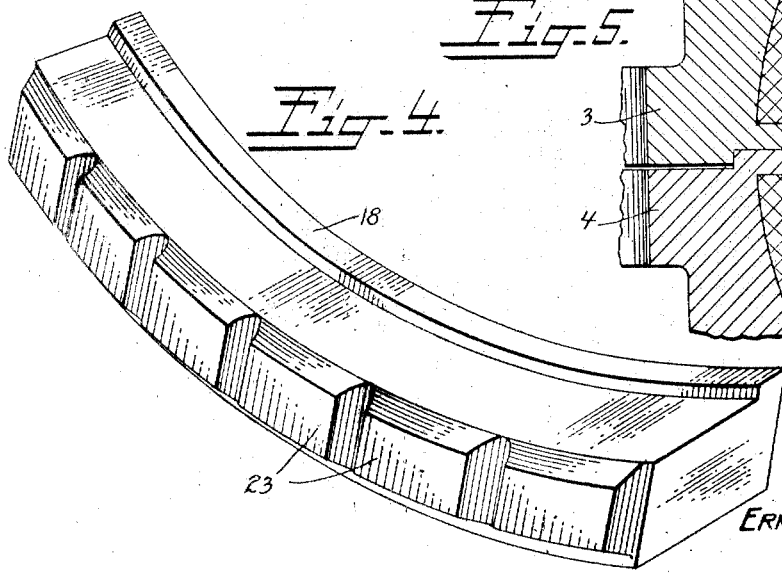
Inventor
ERNEST HOPKINSON
Attorney Patented Aug. 10, 1926.

1,595,193

UNITED STATES PATENT OFFICE.

ERNEST HOPKINSON, OF NEW YORK, N. Y.

VULCANIZING MOLD.

Original application filed April 18, 1922, Serial No. 555,294. Divided and this application filed November 9, 1923. Serial No. 673,662.

This invention relates to the manufacture of tires and more particularly to molds for their vulcanization in a serviceable condition and shape.

Tire vulcanizing molds have heretofore been made by casting or forging them in iron or steel roughly to shape and subsequently machining them, particularly their cavity faces, to the exact contour desired. The machining operations are quite expensive, laborious, and time-consuming, particularly so in fashioning the tread design, which in most cases is done by tedious and difficult engraving.

The present invention aims to provide a mold that is somewhat superior to any that has been used heretofore in that it cures the tires better and externally smoother. A further object of the invention is to provide a mold with a form of lining that may be removed and re-made without any additional material, or a very negligible addition, to either duplicate the original and slightly worn-out shape, or to impart a new contour to the cavity faces of the mold, thus reducing the cost of replacements or changes in shape. Still another object of the invention is to provide a mold that can be made cheaply and rapidly, and therefore will not vex and unduly delay manufacturers in changing the form of their product, or in meeting an emergency such as an urgent requirement for production in excess of the capacity of the mold equipment on hand.

This application is a division of my copending application, Serial No. 555,294, filed April 18, 1922.

Without intention to limit more than is required by the prior art, the invention may be said to consist in a mold having a lining on its inner or tire contacting face which is cast in situ and preferably in a finished or substantially finished condition to the exact contour desired. The mold is made by casting, forging, or machining, each of its sections out of cast iron, or steel, or other wear-resistant metal in the form of a ring which has one of its sides grooved or hollowed out to approximate the outline of a tire that is to be made, the hollow or groove being made larger however than the tire to provide for the reception of a lining. A matrix, or form, is then preferably made out of steel, or other suitable material, in replica preferably of half of a tire and with the portions which are duplicate of the tread design—projections or recesses—defined partly at least by separate and removable sections or segments. About the assembled matrix, which is laid on a pouring-table, the annular ring or shell is positioned and secured so that molten metal may be poured or forced into a cavity, that is defined between the shell and the matrix, and given the exact configuration it is desired to obtain on the tire engaging face or wall of each section of the mold. Then the matrix is removed and a similar procedure is followed in making the other half of the tire vulcanizing mold.

A preferred embodiment of the invention is illustrated in the accompanying drawings in which:—

Figure 3 shows a completed mold and a tire casing within the same as it appears when vulcanized;

Figure 4 is a perspective of a typical form of removable tread segment, and

Figure 5 is a cross-section at the tread-forming region of a mold, showing a slightly modified construction of the outer shell at the parting between the mold sections.

Figure 1:
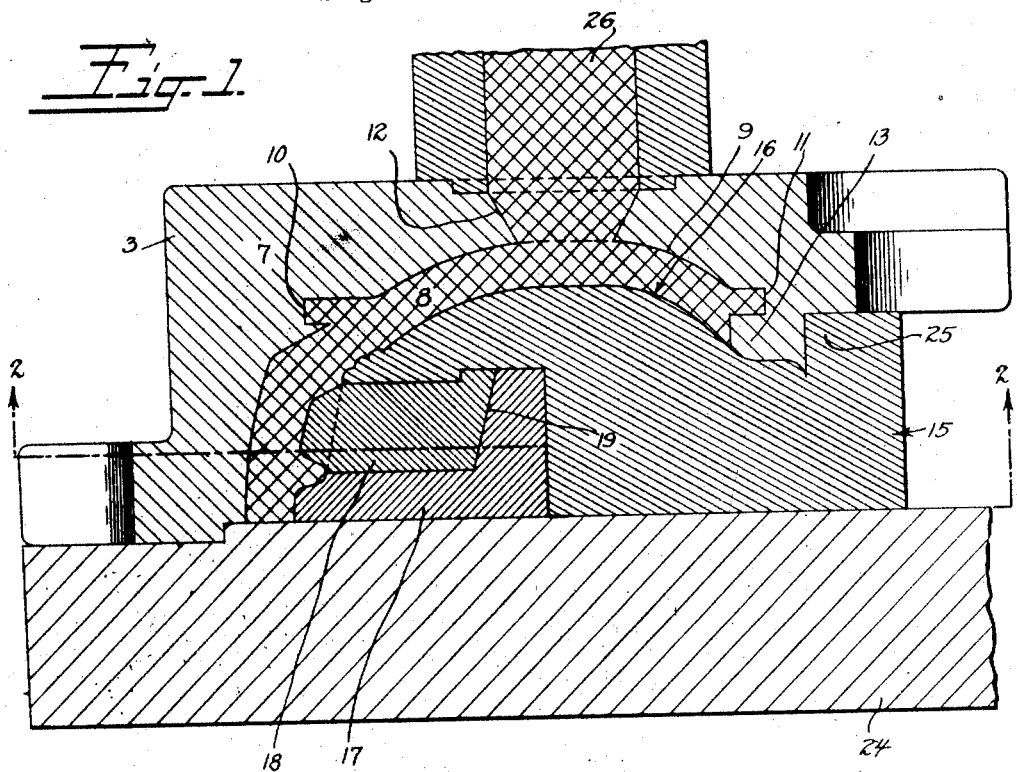
Figure 1 is a cross-section of a mold half being lined with cast metal being set or solidified against a matrix or form of suitable configuration.
Figure 2:
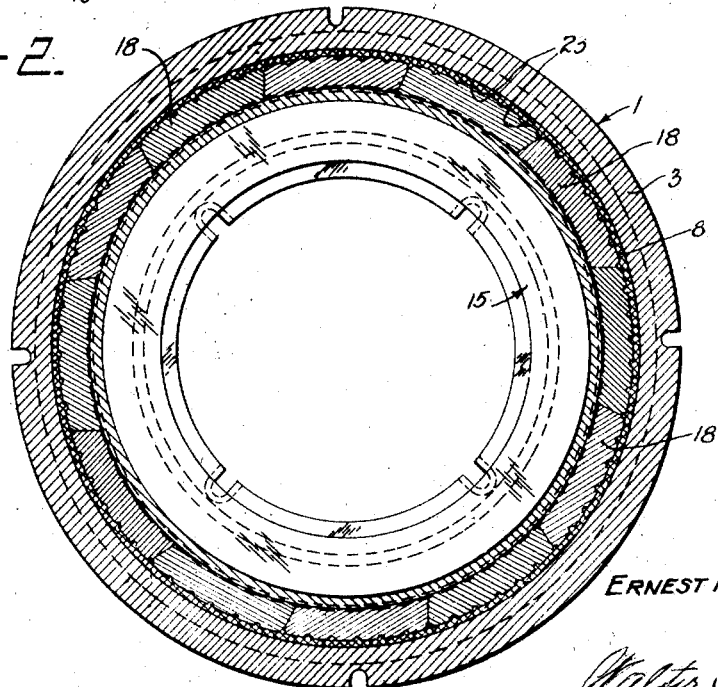
Figure 2 is a section through the mold half on the line 2—2, Figure 1.

In Figure 3 of the drawings a complete vulcanizing mold 1 is shown in cross-section in co-operative relation with a sealing-ring 2, between which latter and the annular sections 3 and 4 of the mold, the beaded portions 5 of a tire casing 6 are clamped while a fluid under a pressure of from 150 to 200 pounds, more or less, is applied to the inside of the casing.

Each of the sections 3 and 4 of the mold consists of an outer shell or wall 7 of iron, steel, or other suitable rigid wear-resistant metal, and an inner wall or lining 8 of any suitable metal that may be cast in a finished condition in its position in the mold. White metal containing tin and lead may be employed for the lining but I prefer to use an aluminum alloy with about 10% copper, which has a hard structure, congeals and solidifies with a smooth surface that finishes the tire better than the old materials, and does not tenaciously cling to the vulcanized or cured casing. Each shell is hollowed out or grooved on one of its sides, as indicated at 9, a little larger than the tire to be cured in the mold and preferably notched or channeled, as indicated at 10 and 11, to provide for anchorage of the lining against displacement. Ports or holes 12 are provided through the walls of the annular shell 7 for the passage of molten metal, preferably at spaced intervals, and either through its sides, as shown, or through its outer periphery, as convenient. The lining is cast to the exact shape of the cavity desired and contacts substantially with the entire exterior of the tire casing. Preferably, however, the lining terminates immediately above the portions of the mold which in use engage the beaded margins of the casing, these portions of the mold being defined, in the case illustrated, by ribs 13 in each of the two sections, extending inwardly from and integral with the hard wear-resistant outer wall or shell 7. The ribs 13 are not essential however, but are desirable to protect the edges of the lining and prolong its serviceability. Ribs 14, see Fig. 5, may be provided to similar advantage at the tread center of the mold, against wear there where the usage is most severe and where the faces of the sections contact and are subjected to pressure in service, these last-named ribs in addition serving to secure the lining against displacement and rendering unnecessary, or less necessary, the provision of notches or channels 10 and 11 in the outer shell.

The mold shown in Fig. 3 and above described in detail, or various modifications of its type, may be manufactured with great ease and dispatch in a manner now to be described.

I first make the outer shell 7 in any suitable manner, as by casting, or forging, or stamping, with or without a rough machining operation in a lathe or mill. The groove 9 is desirably roughed out or blasted clean, but those of its faces which are to engage with the tire casing during a cure, such as the ribs 13 and 14, are accurately machine finished.

I also make a matrix, or form, indicated generally at 15,—preferably of steel and hardened to preserve its sharp outlines—whose surface 16 is preferably a replica of half of the tire for which it is intended. The matrix may be in one piece, if the cavity is smooth and concave from tread to bead, or so shaped that it can be withdrawn without injuring the lining metal. But if the mold is to be provided with indentations or projections to form a superficial design in the tire, I preferably form the matrix with removable sections 17 and 18, carrying the projection portions of the design and having suitable draft, as at 19, between their inter-engaging faces where necessary. The drawing shows a mold for vulcanizing the tread of a well-known casing 6, Fig. 3, whose tread design consists of a central and continuous rib 21, which is flanked on opposite sides by broken ribs 22 constituted by spaced blocks. For the production of this particular type of tread design in the mold, and as an example, I preferably make the section 17 of the matrix a continuous annular ring and the segments or sections 18 arcuate in form and carrying a suitable number of projections 23, which are each a replica of the rubber blocks 22 in the casing that is to be cured in the mold. The number of projections 23 on a segment may be varied to meet requirements, it being essential only to provide sufficient draft or clearance on all sides so as not to mar the lining 8 in removing the parts of the matrix carrying the tread design.

About the matrix 15, the outer shell 7 is positioned, as shown in Fig. 1, and held or secured to a pouring-table 24 in any suitable manner. The matrix is preferably formed with an annular shoulder 25 corresponding in shape and size to the margins of the sealing-ring 2, or core, if the tire casing is to be cured on a core. And the outer shell 7 is machined, or otherwise formed, to inter-fit with the shoulder 25 of the matrix so as to close one edge of the cavity between the matrix and the groove 9 in the shell, the other edge of the cavity being closed either by the support or table 24, as shown in Fig 1, or by a rib 18 of the outer shell, if the latter has been formed thereon. With the outer shell and matrix assembled to define a cavity, as described, molten metal is either poured or forced under several hundred pounds pressure through the holes 12 in the sides or outer periphery of the shell.

When the metal congeals or solidifies, the matrix is removed. If of the construction illustrated in Fig. 1, the annular section 17 of the matrix is first withdrawn by a lateral movement thereof, then the segments 18 carrying several of the tread projections 23 are shaken or picked out, these being movable inwardly and preferably radially of the mold section until clear of the soft lining, and then laterally. When all of the segments have been removed, the body portion of the matrix is then taken out by lateral movement. The slugs 26 of cast metal are finally trimmed off even with the surface of the shell. The other and complementary section of the mold is made in a corresponding manner.

I have illustrated and described a type of mold that is especially adapted for curing tires under internal fluid pressure. But it is to be understood that the same general construction may be employed for molds used to cure tires while they are supported on rigid or collapsible cores or to cure solid tires. It is obvious, of course, that the matrix may be variously sectioned or parted to obtain any desired tread configuration. Provision may be made for first removing the larger part of the matrix from the mold section, when its lining has been cast in place, by suitably locating the lines of parting or cleavage between it and the set of sections carrying the projections of the tread design, in which case a plurality of sets of tread segments may be employed and production of the molds increased. The principles of the present invention are not, therefore, limited to all of the precise details of construction and procedure outlined in the foregoing specification and reference should be made to the appended claims for an understanding of its scope.

Having thus described my invention, what I claim and desire to protect by Letters Patent is:—

1. A method of making a tire vulcanizing mold section which consists in, making an annular ring with a notched annular groove in one side thereof, assembling a matrix which is a replica of a tire divided by a plane passed through the center of its tread, the matrix consisting of sections which carry outwardly extending projections when assembled, placing the ring about the matrix, filling the groove between the ring and the matrix with a metal capable of solidifying in a finished condition, and subsequently removing the matrix without marring the metal lining.

2. A method of making a tire vulcanizing mold which consists in, fashioning an annular ring with a notched annular groove in one of its outer sides which is larger than but follows the outline of half of a tire whose tread is irregular, making a matrix, a replica of the tire half and in sections some of which at least may be moved radially of the matrix and which carry one or more outwardly extending projections, assembling the ring and matrix upon a pouring-table and fixing them thereto so as to define a casting cavity between the ring and matrix, forcing molten metal into the casting cavity at a plurality of points about its circumference, and after the metal has congealed removing the matrix without substantially marring the outline imparted by it to the cast metal.

3. A method of making a tire vulcanizing mold which consists in, fashioning an annular ring with a notched annular groove in one of its sides which is larger than but follows the outline of half of a tire, making a matrix a replica of the tire half and in sections some of which at least may be moved inwardly of the matrix and which carry outwardly extending projections, assembling the ring and matrix upon a pouring-table and fixing them thereto so as to define a casting cavity between the ring and matrix, forcing molten metal under pressure into the casting cavity, and after the metal has congealed removing the matrix without substantially marring the outline imparted by it to the cast metal.

4. A method of making a tire vulcanizing mold section which comprises assembling a sectional core so that some of the sections will carry outwardly extending projections, the assembled core having the desired tire surface conformation, placing the core in a mold having a notched annular inner surface and arranging the core and mold so that the tire surface of the core is spaced apart from the surface of the mold, then pouring molten metal into the space between the mold and core and removing the individual sections of the core.

Signed at New York city, county of New York, and State of New York, this 2nd day of November, 1923.

ERNEST HOPKINSON.